United States Patent [19]

Larson et al.

[11] 4,253,513

[45] Mar. 3, 1981

[54] CAST TIRE AND METHOD OF MANUFACTURE

[75] Inventors: William M Larson, Hudson; Charles J. Pearson, Akron, both of Ohio; Thomas H. Rogers, Clearwater, Fla.

[73] Assignee: The Goodyear Tire & Rubber Company, Akron, Ohio

[21] Appl. No.: 80,938

[22] Filed: Oct. 1, 1979

[51] Int. Cl.³ .......................... B60C 1/00; B29H 3/08
[52] U.S. Cl. .................. 152/354 R; 152/374; 156/110 CL; 156/125; 264/501; 264/255; 264/260
[58] Field of Search ............ 152/330 R, 357 A, 354, 152/374; 156/110 CL, 123 R, 125, 128 P; 264/501, 250, 254, 255, 260, 275, 277, 326

[56] References Cited

U.S. PATENT DOCUMENTS

| | | | |
|---|---|---|---|
| 2,902,072 | 9/1959 | Reuter | 152/330 R |
| 3,701,374 | 10/1972 | McGillvary | 152/330 R |
| 4,044,811 | 8/1977 | Dudek et al. | 152/354 R |
| 4,049,767 | 9/1977 | Vaidya | 264/275 |
| 4,088,523 | 5/1978 | Gallizia | 156/125 |
| 4,185,065 | 1/1980 | Knipp et al. | 264/326 |

*Primary Examiner*—John E. Kittle
*Attorney, Agent, or Firm*—H. C. Young, Jr.; Frederick K. Lacher

[57] ABSTRACT

A tire having a pair of bead portions for mounting on a rim, a tread portion radially outward of said bead portions and connecting sidewalls is cast and cured from different liquid elastomer forming materials in a three-stage process. First, the inner layer of the tire is molded of high modulus material on a collapsible core in a mold with an outer shell. Second, the first outer shell is removed and a second outer shell of a second mold is mounted around the core and cast inner layer. The tread portion of the tire is then molded by centrifugal casting from a low modulus material. Third, the sidewalls are molded of low modulus, optionally microcellular, material by injection of the liquid elastomer forming material into the sidewall spaces between the molded inner layer and the second outer shell.

12 Claims, 5 Drawing Figures

CAST TIRE AND METHOD OF MANUFACTURE

This invention relates generally, as indicated, to a cast tire of the type made by pouring or injection of a liquid elastomer forming material into a mold and especially to a tire construction and method of manufacture in which materials having a different modulus of elasticity are positioned in the tire to provide limited tire growth and optimum flexibility without premature failure from fatigue. Heretofore tires have been cast of a relatively high modulus material to maintain the shape of the tire; however, in operation the repeated stresses imposed at certain points of stress concentration in the tire caused premature failure.

In other tires where plies of material having different modulus of elasticity have been proposed, the tires have had a relatively large number of very thin plies and were built by spraying to form layers of different modulus material on the mold surface and over an outer ply so that the plies of softer material were between and over the plies of harder material. The high modulus plies were located in all parts of the tire and lower modulus plies were interposed between these plies which required a construction in which the low modulus plies were also located in all parts of the tire. Also, there have been problems in the distribution of the sprayed material and in some cases the shaping of the plies required a template or spreader. In other proposed tires having treads of a different modulus material from the tire body, the tread was formed before the body which did not provide for controlling the shape of the body and tread or the filling out of the mold.

The present invention is directed to a composite tire construction and method of manufacturing the tire. A high modulus inner layer at the inner surface of the tire is flexible, has a low tension set and resists growth in service. Low modulus microcellular material at the sidewalls is adhered to the high modulus inner layer and provides cushioning and wear resistance as well as surface definition at the sidewalls. A tread portion which is of a relatively low modulus material but higher than the modulus of the sidewalls is applied to the crown portion to provide the necessary wear resistance.

In accordance with one aspect of the invention, there is provided a method of making a toroidal shaped pneumatic tire comprised of an outer ground contacting tread, a pair of spaced beads and two individual sidewalls extending radially inward from the axially outer edges of said tread to join the respective beads by casting and curing liquid reaction mixture to form an elastomeric material, said method comprising the steps of (A) forming an inner layer by
  (i) providing a rigid mold having an annular core positioned in said cavity to define an inner layer space having a predetermined thickness less than the thickness of the tire,
  (ii) positioning two beads in said space and then injecting a liquid reaction mixture of elastomer forming material into said space, reacting and at least partially curing said reaction mixture to form an inner layer containing said beads having a dimensional stability, and removing said core with said inner layer;

(B) forming the tread by providing a second mold having an annular mold cavity with the surface corresponding to the outer surface of the tire, placing said prepared inner layer and said core in said second mold, introducing and rotational casting or injection molding a predetermined quantity of liquid reaction mixture of elastomer forming material into the space between said annular mold cavity of said second mold and said inner layer to form an outer tread of the tire, reacting and at least partially curing said mixture to form a composite of said tread overlapping and integrally adhered to a radially outer portion of said inner layer having a dimensional stability;

(C) forming the sidewalls by injecting predetermined quantities of liquid reaction mixture of elastomer forming material, optionally containing a blowing agent to partially fill sidewall spaces between the surfaces of said inner layer and said second mold, reacting, optionally expanding and at least partially curing said mixture to fill said sidewall spaces and to provide a composite, optionally microcellular, outer sidewall overlapping and integrally adhered to said inner layer and integrally joining said tread;

(E) finally curing the integrally assembled composite of inner layer, tread portion and sidewalls; and (F) removing said formed tire and core from said mold, and removing said core from said tire.

In accordance with another aspect of the invention, there is provided an annular pneumatic tire for mounting on a rim comprising bead portions, a crown portion spaced radially outward from said bead portions and sidewalls extending from said bead portions to said crown portion, an inner reinforcing layer of relatively high modulus material extending between said bead portions, a tread portion of relatively low modulus material adhered to said inner reinforcing layer at a position radially outward of said crown portion and sidewall portions of relatively low modulus, optionally microcellular, material positioned between and adhered to said reinforcing layer, said tread portion and said bead portions.

With the foregoing in mind and in accordance with still another aspect of the invention, there is provided a composite tire construction in which high modulus material is incorporated for flexibility and strength, low modulus material is included for cushioning and wear resistance, and low modulus microcellular material is included for wear resistance and surface definition.

In accordance with another aspect of this invention, there is provided a tire construction in which one layer of the tire is of high modulus material and the remainder of the tire is of lower modulus materials.

In accordance with yet a further aspect, there is provided a tire construction in which the tire is of a liquid polymer cast and cured in separate sections.

In accordance with still a further aspect, there is provided a method of making a cast tire in which each section of different modulus material is poured or injected into the mold separately.

In accordance with another aspect, there is provided a method in which different mold sections are utilized for pouring or injecting different layers of material into the mold.

In accordance with yet another aspect, there is provided a method in which the different modulus materials are derived from liquid polymers.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
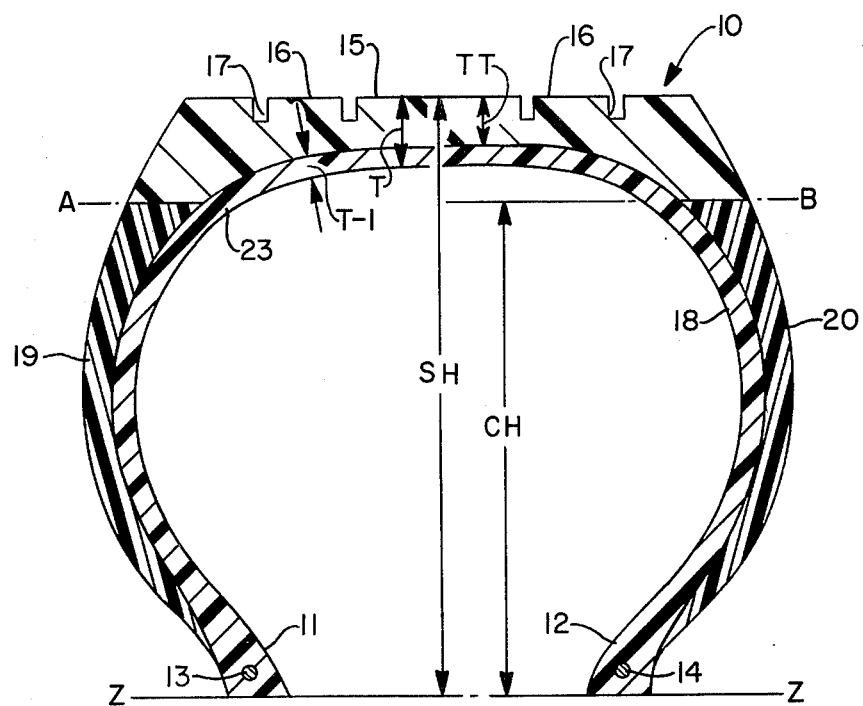
FIG. 1 is a cross-sectional view of a tire built in accordance with this invention.

Referring to FIG. 1, a section of a generally toroidal pneumatic tire 10 made in accordance with the invention is shown which has bead portions 11 and 12 containing annular beads 13 and 14 of wire or relatively inextensible material. The bead portions 11 and 12 are adapted for mounting on a rim (not shown) of a wheel-rotatable about an axis. By "pneumatic tire" is meant a tire having an air chamber therein which may or may not be under pressure during operation. Thus, it includes pneumatic tires which rely on air pressure therein for support and also semipneumatic tires which do not necessarily entirely rely on air pressure within the chamber for support during operation.

Radially outward of the bead portions 11 and 12 is a tread portion 15 having a tread configuration in the radially outer surface including ribs 16 separated by grooves 17. Connecting the bead portions 11 and 12 is a reinforcing inner layer 18 at the radially inner surface of the tire 10. The inner layer 18 has a thickness T-1 which is about one-third the thickness T of the tire wall at the tread portion 15 with the thickness T-T of the tread portion being about two-thirds the thickness T of the tire wall at the tread portion. In the embodiment shown, the thickness T of the wall of the tire 10 at the tread portion 15 is three-quarters of an inch, the thickness T-1 of the inner layer 18 is one-quarter inch and the thickness T-T of the tread portion is one-half inch. This is for a relatively small tire and it is understood these thicknesses may be substantially different for other tire applications. In fact, this invention is particularly adaptable for tires having treads over one inch thick where the curing has taken many hours with other materials but requires a much shorter time with the materials of this invention.

Radially outward of the inner layer 18 at the sides of the tire 10 are sidewalls 19 and 20 extending from the bead portions 11 and 12 to the tread portion 15. Preferably the tread portion 15 extends across a crown portion 23 of the tire 10 which may be defined as a portion of the tire extending from a position A on one sidewall to a position B on the other sidewall with the positions A and B being located at a distance CH from the tire base Z which is not less than three-quarters the section height SH of the tire 10.

Figure 2:
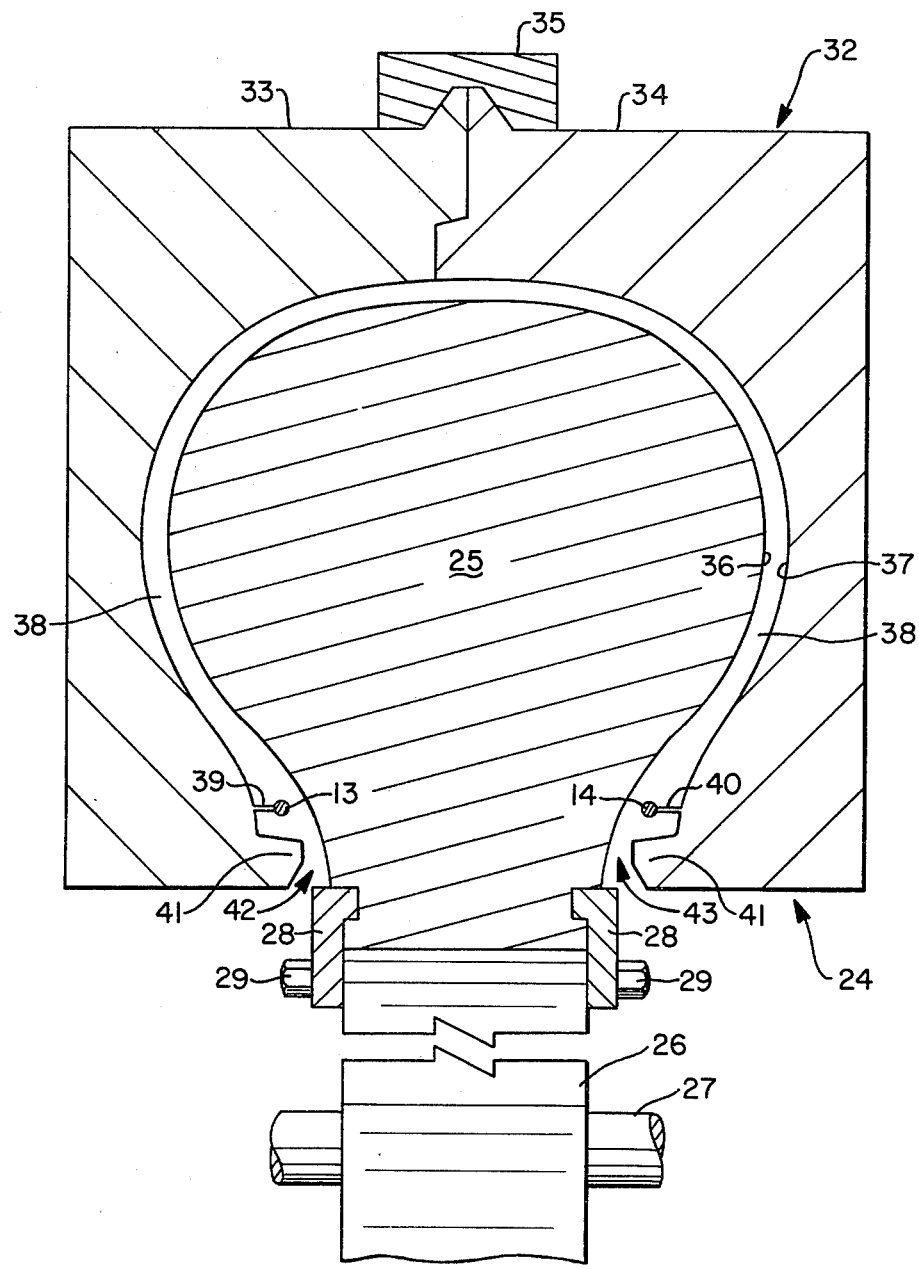
FIG. 2 is a schematic cross-sectional view of a mold and collapsible core for casting the inner layer of the tire shown in FIG. 1.

Apparatus for molding the tire 10 is shown in FIGS. 2 through 5. In FIG. 2, a rigid mold 24 is shown which may be adapted for centrifugal casting and has a segmented collapsible core 25 rotatably mounted on a flange 26 of a shaft 27 as by clamping rings 28 fastened to the flange by fasteners such as bolts and nuts 29.

Positioned around the collapsible core 25 is an outer shell 32 including two mold sections 33 and 34 held together by a clamping ring 35 and also mounted on the shaft 27 for rotation with the collapsible core 25. Between an outer surface 36 of the core 25 and an inner molding surface 37 of the outer shell 32 is provided a cavity 38 for receiving a liquid reaction elastomer forming material to form the inner layer 18 of tire 10. The beads 13 and 14 are held in position by spacers 39 and 40, and annular flanges 41 are positioned adjacent the spacers on the inner molding surface 37 in spaced relation to the outer surface 36 of the core 25 to provide an inlet opening 42 adjacent bead 13 and an outlet opening 43 adjacent the opposite bead 14. The liquid reaction elastomer forming material may be injected through the inlet opening 42 and the mold vented through outlet opening 43. The flanges 41 on inner molding surfaces 37 form the rim-engaging surfaces of the tire bead portions 11 and 12.

The inner layer 18, shown in FIG. 1, may be made by a suitable molding method such as injection molding or centrifugal molding a liquid reaction mixture and curing it to form a suitable polyurethane composition having a hardness of about 90 Shore A to 50 Shore D. Such polyurethane can be prepared by methods well known to those having skill in such art such as, for example, by forming a liquid reaction mixture of and reacting (A) a polymeric polyol, such as a polyester polyol or polyether polyol, having a molecular weight in the range of about 700 to about 10,000 and an average hydroxyl group functionality in the range of about 2 to about 2.3, (B) a slight stoichiometric excess of organic polyisocyanate having an average isocyanate (NCO) functionality in the range of about 2 to 2.3, and (C) chain extending or curing with a diamine or monomeric polyol containing an average of 2 to 2.3 hydroxyl groups. Generally, the polyurethane can be formed by any of the well known prepolymer, quasi-prepolymer or one-shot methods. Usually the prepolymer or quasi-propolymer method is preferred in which a product of reacting (A) and (B) is mixed with a curative (C) to form a reaction mixture.

It is important that the inner layer 18 be of a high modulus material with preferably a modulus of about 900 to 2500 psi at 100 percent elongation, a Young's modulus in the range of about 1450 to about 7250 psi, an ultimate tensile strength of about 4000 to 8000 psi and a tensile set in the range of 0 to 10 percent with the preferred tensile set being less than 3 percent at 100 percent elongation. By "tensile set" is meant the extension remaining after a specimen has been stretched and allowed to retract in a specified manner expressed as a percentage of the original length. The inner layer 18 after pouring into the cavity 38 is maintained at an elevated temperature of about 250° F. (121° C.) for a period of a few minutes to several hours to at least partially cure the layer. The outer shell 32 is then removed by taking off the clamping ring 35 so that the mold sections 33 and 34 may be pulled away from the inner layer 18 which is supported on the core 25.

Figure 3:
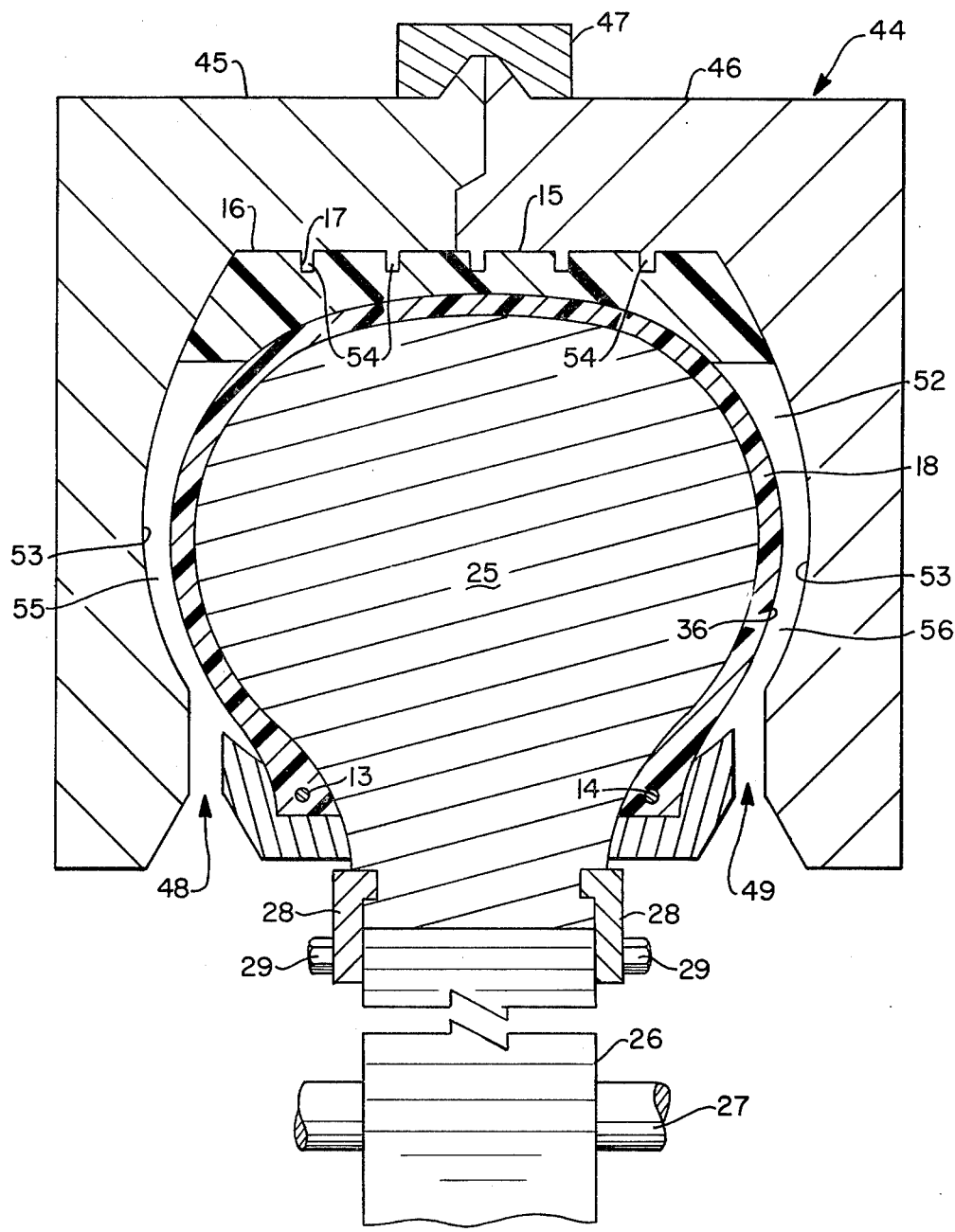
FIG. 3 is a cross-sectional view like FIG. 2 of the tire mold with a second mold and outer shell for casting the tread portion of the tire by centrifugal casting or injection molding.

Referring to FIG. 3, the core 25 and inner layer 18 containing beads 13 and 14 are mounted inside a second mold 44 having mold sections 45 and 46 held together by a clamping ring 47. Suitable heating means (not shown) are provided for heating the mold sections 45 and 46 during the molding operation. The mold sections 45 and 46 are supported for rotation about the axis of shaft 27. Mold openings 48 and 49 in the mold sections 45 and 46 provide access to a mold cavity 52 defined by the inner layer 18 and radially inner surface 53 of the mold sections.

Referring again to FIG. 3, the tread portion 15 of the tire 10 is shown as molded by centrifugal casting or injection molding. The tread portion 15 is made of a low modulus tread mixture of elastomeric material such as a suitable polyurethane of the type previously described for the inner layer but having a modulus in the range of about 400 to about 1500 psi at 100 percent elongation, a Young's modulus in the range of about 750 to about 1450 psi, an ultimate tensile strength in the range of about 1500 to about 7000 psi, an ultimate elongation in the range of about 500 to 1000 percent, a compression set below 25 percent and a glass transition temperature (Tg) below −30° C. By injecting a limited amount of the tread material into the mold cavity 52, only the radially outer portion will be filled during centrifugal casting and provide the tread portion 15 which is adhered to the inner layer 18 and has a tread configuration with grooves 17 molded in the tread surface by ribs 54.

Figure 4:
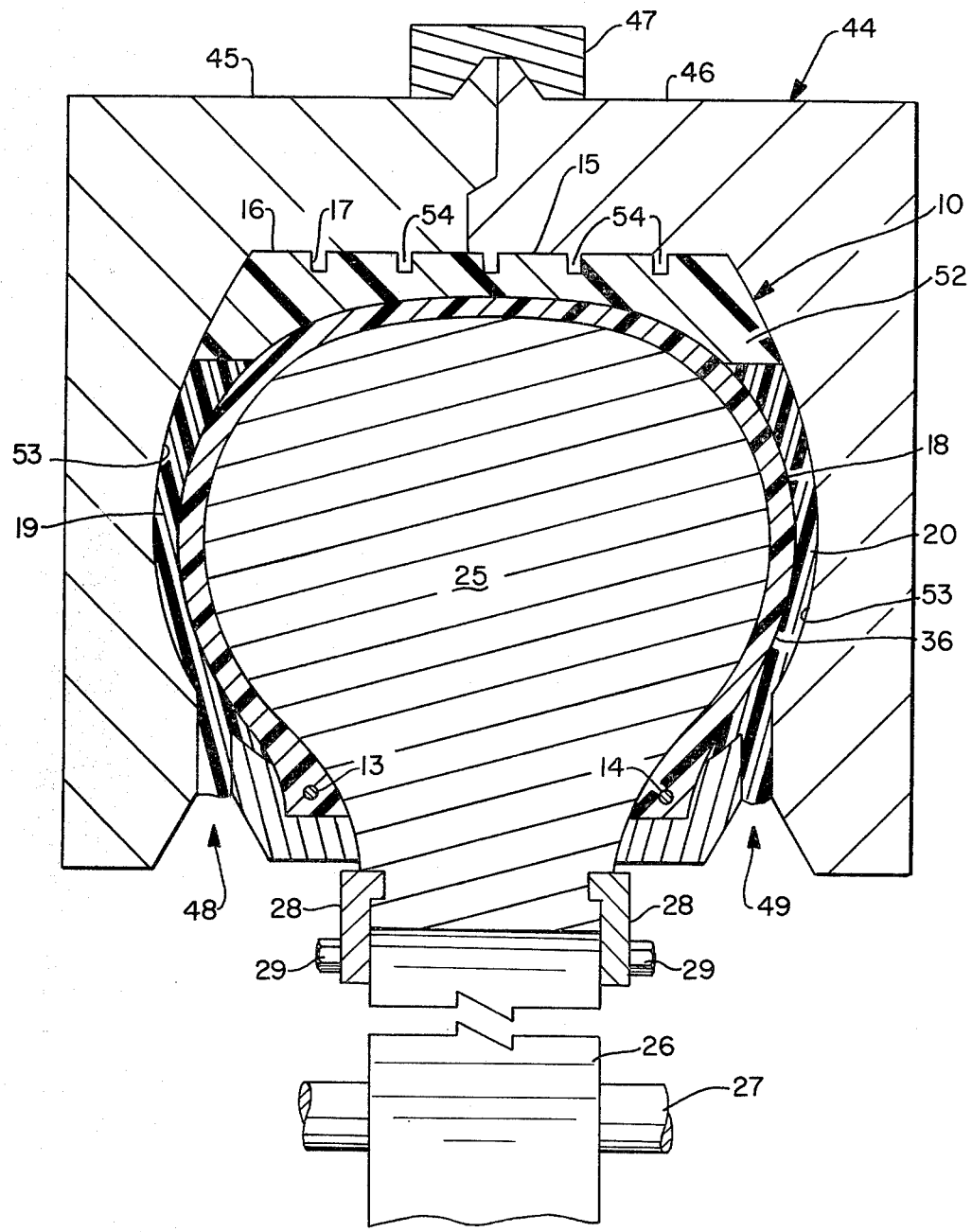
FIG. 4 is a view like FIG. 3 showing the casting of the sidewalls of the tire.

The tread portion 15 is partially cured under controlled temperatures in the mold 44 and then the sidewalls 19 and 20, shown in FIGS. 1 and 4, are molded by injecting a predetermined amount of liquid reaction elastomer forming materials such as polyurethane precursors into sidewall spaces 55 and 56 of the mold cavity 52 which are defined by the radially inner surface 53 of the mold sections 45 and 46, the outer surface 36 of the inner layer 18 and the radially inner surfaces of the tread portion 15. The sidewall spaces 55 and 56 are partially filled by a polyurethane having a low modulus, and optionally a microcellular structure which is provided by including well known inert fluid-blowing agents, in the mixture of quasi-prepolymer and curative to optionally expand the reaction mixture injected into the spaces 55 and 56 during curing. Varying small amounts can be used depending upon the structure desired. Representative blowing agents include air, water (for the production of carbon dioxide upon reaction with a polyurethane precursor), nitrogen, carbon dioxide, and halogenated hydrocarbons such as methylene chloride, trichloromonofluoromethane, dichlorodifluoromethane and 1,2-dichlorotetrafluoroethane. Also useful may be heat-activatable blowing agents such as N-itroso compounds which release nitrogen gas upon decomposition. The microcellular structure reduces the basic polyurethane specific gravity about 5 to about 20 percent and preferably about 5 to 10 percent.

The basic unblown polymer of the sidewalls 19 and 20 has a modulus in the range of about 400 to about 3000 psi, a Young's modulus in the range of about 725 to about 5000 psi, an ultimate tensile strength in the range of about 1500 to about 7000 psi and a glass transition temperature (Tg) below −30° C.

By using a microcellular material for the sidewalls 19 and 20, the sidewall pattern will be filled out during molding as the reaction mixture expands and provide the desired surface definition, particularly by tending to counteract or remedy a tendency, if any, for the formed article to shrink during the molding process.

The sidewalls 19 and 20 as well as the inner layer 18 and tread portion 15 are then retained in the mold 44 for a sufficient time to cure these parts of the tire 10. An example of the curing time and temperatures in the mold for a suitable tire 10 is from a few minutes to several hours at temperatures of from about 150° F. (66° C.) to about 350° F. (177° C.). After curing of the tire 10 in the second mold 44, the clamping ring 47 is taken off which permits removal of the mold sections 45 and 46 from the tire. The collapsible core 25, shown in moe detail in FIG. 5, and the tire 10 molded on the core are disconnected from the flange 26 by removing the nuts and bolts 29 which permits removal of the clamping rings 28 from the core.

Figure 5:
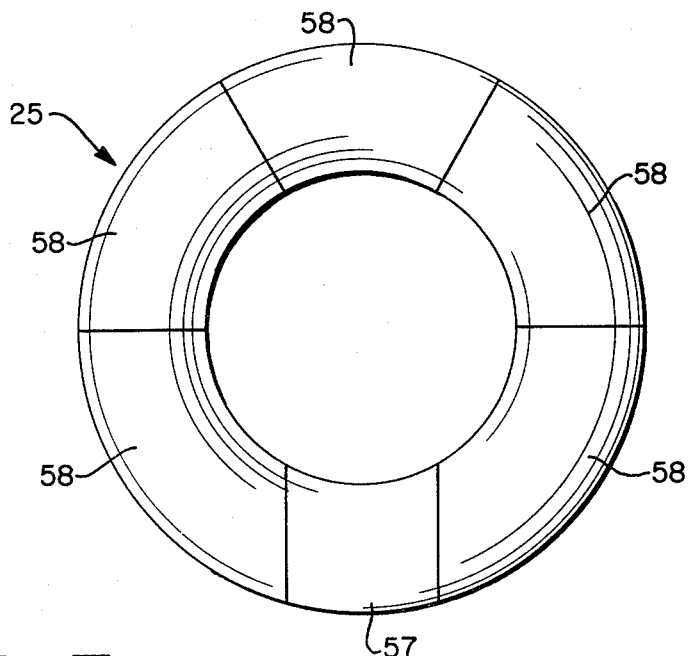
FIG. 5 is a schematic elevation showing the segmented collapsible core.

The core 25 is segmented as shown in FIG. 5 with a key segment 57 and other segments 58 spaced around the circumference of the core. By first removing key segment 57, the other segments 58 may be removed from the tire. The core 25 may then be reassmbled on the flange 26 and the mold 24 positioned around the core for molding of another inner layer 18.

It may be desirable to remove the tire 10 from the mold 44 and place it in a heated curing chamber (not shown) before it is completely cured. In that event, the mold configuration is such that the mold sections 45 and 46 and core 25 can be removed without damaging the tire. The tire 10 is then contained in the curing chamber at substantially the same curing temperatures for a period of time from a few minutes to several hours until the tire is completely cured. The tire 10 is then removed from the curing chamber and cooled to room temperature.

In the description of this invention, polyurethanes are described and, indeed preferred. Such chemistry is generally known to those having skill in the art. Generally the polyurethane precursors are provided as a liquid reaction mixture which is cast and cured in the mold. The liquid reaction mixture is generally of the conventional prepolymer, quasi-prepolymer or one-shot method. Ingredients for the polyurethanes are conventionally polymeric polyols, polyisocyanates and a diamine or monomeric polyol, usually a diol, curative. A small amount of organic solvent is used, as necessary, as a carrier; however, for this invention, it is preferred that the solvent is not used at all. The polymeric polyols are typically polyester or polyether polyols having a molecular weight in the range of about 700 to about 10,000.

In the practice of this invention, it is prefered that the polymeric polyol have a hydroxyl functionality of about 2 in order to enhance the elastomeric characteristic of the polyurethane. The polyurethane is prepared with a slight excess of isocyanate so that the diamine or diol, preferably a diamine curative can react therewith to perform the necessary crosslink or extension.

While a certain representative embodiment and details have been shown for the purpose of illustrating the invention, it will be apparent to those skilled in the art that various changes and modifications may be made therein without departing from the spirit or scope of the invention.

We claim:

1. A method of making a toroidal shaped pneumatic tire comprised of an outer ground contacting tread, a pair of spaced beads and two individual sidewalls extending radially inward from the axial outer edges of said tread to join the respective beads, by casting and curing liquid reaction mixture to form an elastomeric material, said method comprising the steps of
(A) forming an inner layer by
   (i) providing a rigid mold having an annular mold cavity, and an annular core positioned in said cavity to define an inner layer space having a predetermined thickness less than the thickness of the tire,
   (ii) positioning two beads in said space and then injecting a liquid reaction mixture of elastomer forming material into said space, reacting and at least partially curing said reaction mixture to form an inner layer containing said beads having a dimensional stability, and removing said core with said inner layer;

(B) forming the tread by providing a second mold having an annular mold cavity with the surface corresponding to the outer surface of the tire placing said prepared inner layer and said core in said second mold, introducing and optionally rotationally casting a predetermined quantity of liquid reaction mixture of elastomer forming material into the space between said annular mold cavity of said second mold and said inner layer to form an outer tread of the tire, reacting and at least partially curing said mixture to form a composite of said tread overlapping and integrally adhered to a radially outer portion of said inner layer having a dimensional stability;

(C) forming the sidewalls by injecting predetermined quantities of liquid reaction mixture of elastomer forming material optionally containing a blowing agent to partially fill sidewall spaces between the surfaces of said inner layer and said second mold, reacting, optionally expanding and at least partially curing said mixture to fill said sidewall spaces and to provide a composite, optionally microcellular, outer sidewall overlapping and integrally adhered to said inner layer and integrally joining said tread;

(D) finally curing the integrally assembled composite of inner layer, tread portion and sidewalls; and (E) removing said formed tire and core from said mold, and removing said core from said tire.

2. The method of claim 1 wherein said mold is heated to at least partially cure the inner layer, tread portion and the sidewalls.

3. The method of claim 1 wherein said first-mentioned mold is split in two pieces for facilitating removal of the core and inner layer from the mode.

4. The method of claim 1 or 3 wherein said second mold is split in two pieces to facilitate removal of said tire and core from the second mold.

5. The method of claim 1 wherein said core is assembled from segments and removing said core from said tire includes the disassembly of said segments.

6. The method of claim 1 wherein said inner layer is formed by rotational casting.

7. The method of claim 6 wherein said side-walls are formed by injection molding.

8. The method of claim 1 wherein said side-wall spaces are charged with said sidewall mixture and the expansion process completely fills the sidewall spaces.

9. An annular pneumatic tire for mounting on a rim comprising bead portions, a crown portion spaced radially outward from said bead portions and sidewalls extending from said bead portions to said crown portion, a strong cast inner layer of relatively high modulus material extending between said bead portions, a tread portion of relatively low modulus material adhered to said inner reinforcing layer at a position radially outward of said crown portion and sidewall portions of microcellular relatively low modulus material positioned between and adhered to said reinforcing layer, said tread portion and said bead portions.

10. The annular pneumatic tire of claim 9 wherein said sidewall portions are of elastomeric materials having a modulus less then the modulus of the material of said tread portion and said inner layer.

11. The annular pneumatic tire of claim 10 wherein said elastomeric materials of said sidewall portions are microcellular for surface definition and wear resistance.

12. The annular pneumatic tire of claim 9 wherein said inner layer is of a polyurethane composition having a hardness of about 90 Shore A to 60 Shore D with a relatively high modulus of elasticity in the range of about 900 to about 2500 psi at 100 percent elongation, a Young's modulus in the range of about 1450 to about 7250 psi, an ultimate tensile strength in the range of about 4000 to about 8000 psi and a tensile set in the range of 0 to about 10 , said tread portion is of a polyurethane composition having a relatively low modulus of elasticity in the range of about 400 to about 1500 psi at 100 percent elongation, a Young's modulus in the range of about 750 to about 1450 psi, an ultimate tensile strength in the range of about 1500 to 7000 psi, an ultimate elongation in the range of about 500 to 1000 percent, a compression set below 25 percent and a glass transition temperature below −30° C. and said sidewalls are of a polyurethane composition with a relatively low modulus and an optional microcellular structure with the basic unblown polymer having a modulus of elasticity in the range of about 300 to about 1500 psi at 100 percent elongation, a Young's modulus in the range of about 725 psi to about 5000 psi, ultimate tensile strength in the range of about 1500 psi to about 7000 psi, and a glass transition temperature below −30° C.

* * * * *

UNITED STATES PATENT AND TRADEMARK OFFICE
CERTIFICATE OF CORRECTION

PATENT NO. : 4,253,513

DATED : March 3, 1981

INVENTOR(S) : William H Larson, Charles J Pearson and Thomas H Rogers

It is certified that error appears in the above-identified patent and that said Letters Patent are hereby corrected as shown below:

Column 7, line 37, Claim 3 - "mode" should read --mold--.

Signed and Sealed this

Twenty-sixth Day of April 1983

[SEAL]

Attest:

GERALD J. MOSSINGHOFF

Attesting Officer

Commissioner of Patents and Trademarks